(12) United States Patent
Yang

(10) Patent No.: US 11,263,416 B2
(45) Date of Patent: Mar. 1, 2022

(54) TWO-DIMENSIONAL CODE GENERATION AND IDENTIFICATION

(71) Applicant: Beijing Sankuai Online Technology Co., Ltd, Beijing (CN)

(72) Inventor: Chongling Yang, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 0 days.

(21) Appl. No.: 16/967,128

(22) PCT Filed: Dec. 10, 2018

(86) PCT No.: PCT/CN2018/119983
§ 371 (c)(1),
(2) Date: Aug. 3, 2020

(87) PCT Pub. No.: WO2019/153867
PCT Pub. Date: Aug. 15, 2019

(65) Prior Publication Data
US 2020/0364429 A1     Nov. 19, 2020

(30) Foreign Application Priority Data

Feb. 7, 2018 (CN) .......................... 201810123416.0

(51) Int. Cl.
*G06K 5/00* (2006.01)
*G06K 7/14* (2006.01)
*G06K 19/06* (2006.01)

(52) U.S. Cl.
CPC ......... *G06K 7/1473* (2013.01); *G06K 7/1417* (2013.01); *G06K 19/06037* (2013.01)

(58) Field of Classification Search
CPC .......... G06K 19/06037; G06K 7/1417; G06K 7/1473; G06K 1/12
See application file for complete search history.

(56) References Cited

U.S. PATENT DOCUMENTS 6,606,396 B1 * 8/2003 Ishibashi .................. G06K 7/14
283/72
2004/0223197 A1 * 11/2004 Ohta .................. G06K 9/00456
358/538

(Continued)

FOREIGN PATENT DOCUMENTS

CN     102034127 A     4/2011
CN     102118710 A     7/2011

(Continued)

OTHER PUBLICATIONS

State Intellectual Property Office of the People's Republic of China, Office Action and Search Report Issued in Application No. 2018101234160, dated Dec. 26, 2019, 18 pages, (Submitted with Machine Translation).
State Intellectual Property Office of the People's Republic of China, Office Action and Search Report Issued in Application No. 2018101234160, dated Apr. 3, 2020, 20 pages, (Submitted with Machine Translation).

(Continued)

*Primary Examiner* — Thien M Le
(74) *Attorney, Agent, or Firm* — Kilpatrick Townsend & Stockton, LLP

(57) ABSTRACT

A two-dimensional code generation method and apparatus, a two-dimensional code identification method and apparatus, an electronic device, and a storage medium are provided. The method includes generating a data codeword sequence according to input information, encrypting the data codeword sequence to generate an encrypted codeword sequence, determining a number of error correction blocks, and generating the two-dimensional code from the data codeword sequence and the encrypted codeword sequence according to a construction mode corresponding to the number of error correction blocks.

9 Claims, 3 Drawing Sheets

(56) References Cited

U.S. PATENT DOCUMENTS

| | | | | |
|---|---|---|---|---|
| 2004/0247206 A1* | 12/2004 | Kaneda | ............... | G06F 16/56 |
| | | | | 382/305 |
| 2005/0111053 A1* | 5/2005 | Yoshida | ............... | G06T 11/60 |
| | | | | 358/448 |
| 2005/0286805 A1* | 12/2005 | Yoshida | ............... | G06K 9/481 |
| | | | | 382/305 |
| 2016/0267370 A1* | 9/2016 | Nishizaki | ............ | G06K 7/1434 |
| 2019/0370620 A1* | 12/2019 | Shen | ............... | G06K 19/06056 |

FOREIGN PATENT DOCUMENTS

| | | |
|---|---|---|
| CN | 103778453 A | 5/2014 |
| CN | 104376356 A | 2/2015 |
| CN | 104618334 A | 5/2015 |
| CN | 105825257 A | 8/2016 |
| CN | 106156820 A | 11/2016 |
| CN | 106296170 A | 1/2017 |
| CN | 106529633 A | 3/2017 |
| CN | 106651734 A | 5/2017 |
| CN | 107067056 A | 8/2017 |
| CN | 107169395 A | 9/2017 |
| CN | 107395581 A | 11/2017 |
| JP | 2015212934 A | 11/2015 |

OTHER PUBLICATIONS

State Intellectual Property Office of the People's Republic of China, Notice of Rejection of decision Issued in Application No. 2018101234160, dated May 29, 2020, 17 pages, (Submitted with Partial Translation).

ISA State Intellectual Property Office of the People's Republic of China, International Search Report Issued in Application No. PCT/CN2018/119983, dated Feb. 27, 2019, WIPO, 4 pages.

Hou Zhengxin et al, "Overview of Forward Error Correction Channel Coding", Principle of Television (Seventh Edition), Sep. 30, 2016, 8 pages.

Yang Meixia, "Two-digit code recognition", Principles and application practice of radio frequency identification technology, Aug. 31, 2017, 9 pages.

Canada Patent Office, Office Action issued in Application No. 3090716, dated Sep. 14, 2021, 6 pages.

Japanese Patent Office Action, Office Action Issued in Application No. 2020-540589, dated Sep. 7, 2021, 11 pages, (Submitted with Machine Translation).

Eiji Okamoto, "Cryptographic Key Delivery Management Scheme and Secret Information Distribution Scheme", Introduction to Cryptology, Oct. 1, 1996, 34 pages.(Submitted with Machine Translation).

* cited by examiner

TWO-DIMENSIONAL CODE GENERATION AND IDENTIFICATION

CROSS REFERENCE TO RELATED APPLICATIONS

This application is a National Stage of International Application No. PCT/CN2018/119983 filed on Dec. 10, 2018 which claims priority to Chinese Patent Application No. 201810123416.0, filed on Feb. 7, 2018, and entitled "TWO-DIMENSIONAL CODE GENERATION METHOD AND APPARATUS AND TWO-DIMENSIONAL CODE IDENTIFICATION METHOD AND APPARATUS", both of which are incorporated herein by reference in their entireties.

At present, the examples of embodiments are described comprehensively with reference to the accompanying drawings. However, the examples of embodiments can be implemented in a plurality of forms, and it should not be understood as being limited to the embodiments described herein. Conversely, the embodiments are provided to make the present disclosure more comprehensive and complete, and comprehensively convey the idea of the examples of the embodiments. A same reference numeral in the accompanying drawings represents same or similar components, and therefore repeated descriptions of the components are appropriately omitted.

In addition, the described features, structures, or characteristics may be combined in one or more embodiments in any appropriate manner. In the following descriptions, a lot of specific details are provided to give a comprehensive understanding of the embodiments of the present disclosure. However, the present disclosure may be implemented without one or more of the particular details, or another method, element, material, apparatus, step, and the like may be used. In other cases, well-known structures, methods, apparatuses, implementations, materials, or operations are not shown or described in detail, in order not to obscure the embodiments of the present disclosure.

The present disclosure may be implemented as a system, a method, or a program product. Therefore, various embodiments of the present disclosure may be specifically implemented in the following form: a hardware only embodiment, a software only embodiment (including firmware, microcode, and the like), or an embodiment of a combination of software and hardware, which may be collectively referred to as a "circuit", a "module", or a "system" herein.

Through the description of the foregoing embodiments described herein may be implemented through software, or may be implemented through software in combination with necessary hardware. Therefore, according to the embodiments of the present disclosure may be embodied in the form of a software product. The software product may be stored in a non-volatile storage medium (which may be a CD-ROM, a U disk, a mobile hard disk, and the like) or on a network, including several instructions to enable a computing device (which may be a personal computer, a server, a terminal device, a network device, or the like) to perform the method according to the embodiment of the present disclosure.

FIELD

The present disclosure relates to the field of computer technologies, and in particular, to two-dimensional code generation and identification.

BACKGROUND

With the development of Internet technologies and communication technologies, a two-dimensional code is widely used in various fields due to simple and convenient characteristics thereof. However, due to the simple and convenient characteristics, the two-dimensional code has become a new channel of infecting a mobile terminal. In an application scenario such as scanning code login or payment by using the mobile terminal, there are numerous cases of user information leakage and property loss, and therefore the security of the two-dimensional code in the application has great hidden dangers.

SUMMARY

The present disclosure is intended to provide a two-dimensional code generation method, a two-dimensional code generation apparatus, a two-dimensional code identification method, a two-dimensional code identification apparatus, an electronic device, and a computer readable storage medium.

According to one embodiment of the present disclosure, a two-dimensional code generation method is provided, including: generating a data codeword sequence according to input information; encrypting the data codeword sequence to generate an encrypted codeword sequence; determining a number of error correction code blocks; and generating a two-dimensional code from the data codeword sequence and the encrypted codeword sequence according to a construction mode corresponding to the number of error correction blocks.

In an exemplary embodiment of the present disclosure, the encrypting the data codeword sequence to generate an encrypted codeword sequence comprises: generating a key corresponding to the data codeword sequence according to a key management system; encrypting the data codeword sequence according to an encryption algorithm by using the key; and converting the encrypted data codeword sequence into the encrypted codeword sequence according to a preset coding algorithm.

In an exemplary embodiment of the present disclosure, the determining a number of error correction blocks includes: acquiring a length of the data codeword sequence and an error correction level; and searching preset error correction characteristic table items for the corresponding number of error correction blocks according to the length of the data codeword sequence and the error correction level.

In an exemplary embodiment of the present disclosure, the generating a two-dimensional code from the data codeword sequence and the encrypted codeword sequence according to a construction mode corresponding to the number of error correction blocks includes: determining whether the number of error correction blocks is greater than a preset threshold, if yes, searching preset error correction characteristic table items for a corresponding error correction block, and filling the corresponding error correction block with the encrypted codeword sequence; or otherwise filling, with the encrypted codeword sequence, a last data codeword block constituting the two-dimensional code.

According to one embodiment of the present disclosure, a two-dimensional code identification method is provided, including: reading and analyzing an encrypted two-dimensional code; acquiring a number of error correction blocks; recovering a data codeword sequence and an encrypted codeword sequence of the two-dimensional code according to a data recovery method corresponding to the number of error correction code blocks; and performing security verification on the encrypted codeword sequence, and acquiring input information after the encrypted codeword sequence passes the security verification.

In an exemplary embodiment of the present disclosure, the recovering a data codeword sequence and an encrypted codeword sequence of the two-dimensional code according to a data recovery method corresponding to the number of error correction blocks includes: determining whether the number of error correction blocks is greater than a preset threshold, if yes, searching preset error correction characteristic table items for a corresponding error correction block, and acquiring the encrypted codeword sequence in the error correction block through a decoding algorithm; or otherwise acquiring, through the decoding algorithm, the encrypted codeword sequence in a last data codeword block constituting the two-dimensional code.

According to one embodiment of the present disclosure, a two-dimensional code generation apparatus is provided, including: a data codeword generating device configured to generate a data codeword sequence according to input information; an encryption codeword generating device configured to encrypt the data codeword sequence to generate an encrypted codeword sequence; an error correction code block determining device configured to determine a number of error correction code blocks; and a two-dimensional code information generating device configured to generate the two-dimensional code from the data codeword sequence and the encrypted codeword sequence according to a construction mode corresponding to the number of error correction code blocks.

According to one embodiment of the present disclosure, a two-dimensional code identification apparatus is provided, including: a two-dimensional code information reading device configured to read and analyze an encrypted two-dimensional code; an error correction code block determining device configured to determine a number of error correction blocks; a codeword recovering device configured to recover a data codeword sequence and an encrypted codeword sequence of the two-dimensional code according to a data recovery method corresponding to the number of error correction blocks; and an input information acquiring device configured to perform security verification on the encrypted codeword sequence, and acquire input information after the encrypted codeword sequence passes the security verification.

According to one embodiment of the present disclosure, an electronic device is provided, including: a processor; and a storage medium storing a machine-readable instruction, the machine-readable instruction, when executed by the processor, implementing any of the methods.

According to one embodiment of the present disclosure, a computer readable storage medium is provided, a computer program being stored thereon, the computer program, when executed by a processor, implementing any of the methods.

According to the two-dimensional code generation method in the exemplary embodiments of the present disclosure, a data codeword sequence is generated according to input information, the data codeword sequence is encrypted to generate an encrypted codeword sequence, and after a number of error correction blocks is determined, the two-dimensional code is generated from the data codeword sequence and the encrypted codeword sequence according to a construction mode corresponding to the number of error correction blocks. On the one hand, because the data codeword sequence may be encrypted, the data content can be prevented from being tampered with, thereby improving the security of the two-dimensional code. On the other hand, because the two-dimensional code information is generated from the data codeword sequence and the encrypted codeword sequence according to a mode corresponding to the number of error correction blocks, the encrypted codeword sequence may further be completely filled with higher efficiency.

It should be understood that the above general descriptions and the following detailed descriptions are merely for exemplary and explanatory purposes, and cannot limit the present disclosure.

BRIEF DESCRIPTION OF THE DRAWINGS

Embodiments of the present disclosure will become more apparent from the detailed description of exemplary embodiments of the present disclosure with reference to the accompanying drawings.

DETAILED DESCRIPTION OF THE EMBODIMENTS

Figure 1:
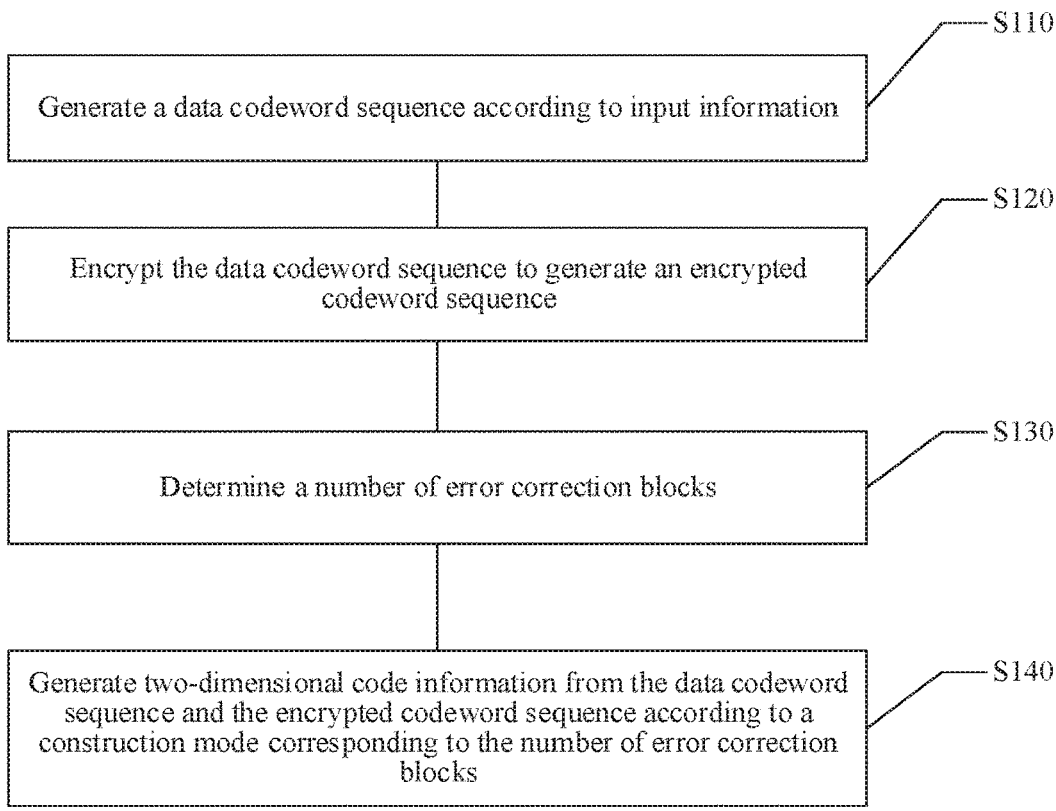
FIG. 1 is a flowchart of a two-dimensional code generation method according to an exemplary embodiment of the present disclosure.

At present, the examples of embodiments are described comprehensively with reference to the accompanying drawings. However, the examples of embodiments can be implemented in a plurality of forms, and it should not be understood as being limited to the embodiments described herein. Conversely, the embodiments are provided to make the present disclosure more comprehensive and complete, and comprehensively convey the idea of the examples of the embodiments to a person skilled in the art. A same reference numeral in the accompanying drawings represents same or similar components, and therefore repeated descriptions of the components are appropriately omitted.

In addition, the described features, structures, or characteristics may be combined in one or more embodiments in any appropriate manner. In the following descriptions, a lot of specific details are provided to give a comprehensive understanding of the embodiments of the present disclosure. However, a person of skill in the art should be aware that, the technical solutions in the present disclosure may be implemented without one or more of the particular details, or another method, element, material, apparatus, step, and the like may be used. In other cases, well-known structures, methods, apparatuses, implementations, materials, or operations are not shown or described in detail, in order not to obscure the embodiments of the present disclosure.

Block diagrams shown in the accompany drawings are functional entities and do not necessarily correspond to physically or logically independent entities. That is, such functional entities may be implemented in the form of software, or implemented in one or more hardware devices or integrated circuits, or implemented in different networks and/or processor apparatuses and/or microcontroller apparatuses.

In this example, a two-dimensional code generation method is first provided, which may be applied to a network device. The network device may be an electronic device such as a server. Referring to FIG. 1, the two-dimensional code generation method may include the following steps.

Step S110: Generate a data codeword sequence according to input information.

Step S120: Encrypt the data codeword sequence to generate an encrypted codeword sequence.

Step S130: Determine a number of error correction blocks.

Step S140: Generate two-dimensional code information from the data codeword sequence and the encrypted codeword sequence according to a construction mode corresponding to the number of error correction blocks.

According to the two-dimensional code generation method, on the one hand, because the data codeword sequence may be encrypted, the data content can be prevented from being tampered with, thereby improving the security of the two-dimensional code. On the other hand, because the two-dimensional code information is generated from the data codeword sequence and the encrypted codeword sequence according to a mode corresponding to the number of error correction blocks, the encrypted codeword sequence may be completely filled with higher efficiency.

The two-dimensional code generation method in this example will be further described below.

Step S110: Generate a data codeword sequence according to input information.

The input information is an input data stream and is the information required for generating the two-dimensional code. In this exemplary embodiment, the input information is first analyzed to determine a length thereof, and a format and version of the corresponding two-dimensional code are determined according to the length of the input information. The format of the two-dimensional code includes information such as an error correction level, a mask number, an error correction code, and the like. There may be a plurality of versions of the two-dimensional code, each version representing an inherent symbol structure. Since the mask number can only be obtained later in the mask operation, the mask number at this time may be empty.

Then the input information is converted into a bit stream through data coding, and it is determined whether mode conversion is required to convert the data bit stream into a shorter length. In addition, after the input information is converted into the bit stream through data coding, an RS code data codeword sequence corresponding to the input information may be generated by using an algorithm such as Reed-Solomon error correction (RS error correction) coding.

In step S120, the data codeword sequence is encrypted to generate an encrypted codeword sequence.

In this example, the step may include: generating a key corresponding to the data codeword sequence according to a key management system, and encrypting the data codeword sequence according to an encryption algorithm by using the generated key; and converting the encrypted data codeword sequence into the encrypted codeword sequence according to a preset coding algorithm.

After the RS code data codeword sequence is obtained, in an embodiment, the generating a key corresponding to the RS code data codeword sequence according to a key management system includes: inputting the RS code data codeword sequence into the key management system, to generate a key corresponding to the RS code data codeword sequence. In another embodiment, an encoding symbol corresponding to the RS code data codeword sequence may be generated, and a key corresponding to the encoding symbol may be generated by inputting the encoding symbol to the key management system.

In this example, because the key generation rules of different key management systems are different, the methods for generating the key through different key management systems are different, and therefore the keys corresponding to the RS code data codeword sequence generated by different key management systems may also be different. The present disclosure has no special restrictions on the key management system and the key generation rules.

After the key corresponding to the data codeword sequence is generated, the data codeword sequence may be encrypted by using the key and an encryption algorithm. Then, the encrypted data codeword sequence is subjected to a finite field conversion and encoded by an algorithm such as RS error correction coding, thereby obtaining a securely encrypted RS code encryption codeword sequence. The encryption algorithm may be a data encryption standard (DES) encryption algorithm, an advanced encryption standard (AES) encryption algorithm, and the like, which is not specifically limited in the present disclosure.

In step S130, the number of error correction blocks is determined.

In this exemplary embodiment, the step may include: acquiring a length (for example, represented by the number of codewords) of the data codeword sequence and an error correction level; and searching preset error correction characteristic table items for the number of error correction blocks according to the length of the data codeword sequence and the error correction level.

The preset error correction characteristic table items may be preset according to information such as the length of the data codeword sequence and the error correction level.

For example, reference may be made to the following table:

TABLE 1

| Version | Total number of codewords | Error correction level | Number of error correction blocks | Error correction code of each error correction block |
|---|---|---|---|---|
| 1 | 26 | L | 1 | (26, 19, 2) |
|  |  | M | 1 | (26, 16, 4) |
|  |  | Q | 1 | (26, 13, 6) |
|  |  | H | 1 | (26, 9, 8) |
| 2 | 44 | L | 1 | (44, 34, 4) |
|  |  | M | 1 | (44, 28, 8) |
|  |  | Q | 1 | (44, 22, 11) |
|  |  | H | 1 | (44, 16, 14) |
| 3 | 70 | L | 1 | (70, 55, 7) |
|  |  | M | 1 | (70, 44, 13) |
|  |  | Q | 2 | (35, 17, 9) |
|  |  | H | 2 | (35, 13, 11) |
| ... | ... | ... | ... | ... |

Table 1 shows preset error correction characteristic table items, which are only used to further understand the examples of the present disclosure, and are not used to limit specific contents in the preset error correction characteristic table items.

A version, a total number of codewords, an error correction level, a corresponding number of error correction blocks, and a correspondence between error correction codes of each error correction block are preset in the preset error correction characteristic table items. The error correction code of each error correction block may be represented as (c, k, r), where c represents the total number of codewords of each error correction block, k represents the number of data codewords in the error correction block, r represents the number of error correction capacity of the error correction block, and c, k, r satisfy the following relation: c=k+2*r.

After the RS code data codeword sequence is generated, the number of corresponding error correction blocks may be found in Table 1 according to the length of the RS code data codeword sequence (that is, the total number of codewords in the sequence), the predetermined version number, and the error correction level.

In step S140, two-dimensional code information is generated from the data codeword sequence and the encrypted codeword sequence according to a construction mode corresponding to the number of error correction blocks.

In this exemplary embodiment, the step may include: determining whether the number of error correction blocks is greater than a preset threshold, if yes, searching preset error correction characteristic table items for a corresponding error correction that is specified to fill, and filling the error correction block with the encrypted codeword sequence; or otherwise filling, with the encrypted codeword sequence, a last data codeword block constituting the two-dimensional code. The construction mode may include a block cross construction mode and a supplementary construction mode. For example, a preset threshold may be set to 1, if it is determined that the number of error correction blocks is greater than 1, the block cross construction mode is adopted, and if the number of error correction blocks is less than or equal to 1, the supplementary construction mode is adopted.

For example, if it is determined in step S110 that the version is 3, the error correction level is Q, and the data length of the data codeword sequence is 70, then the corresponding number of error correction blocks may be found to be 2 in Table 1. Since the number 2 of error correction blocks is greater than the preset threshold 1, final information may be constructed by using a block cross construction mode, that is, looking up error correction codes (35, 17, 9) of each error correction block corresponding to the error correction level Q, the data length 70, and the version number 3 in Table 1, and filling a supplementary bit in each error correction block (35, 17, 9) with the RS code encryption codeword sequence, thereby constructing the final information.

However, if it is determined in step S110 that the version is 2, the error correction level is Q, and the data length of the data codeword sequence is 44, then the corresponding number of error correction blocks may be found to be 1 in Table 1. Since the number 1 of error correction blocks is equal to the preset threshold 1, final information may be constructed by using the supplementary construction mode, that is, filling, with the encrypted codeword sequence, a supplementary bit of a last data codeword block constituting the two-dimensional code, thereby constructing the final information.

In this exemplary embodiment, in order to ensure the integrity of the encryption codeword construction, the length of an encrypted codeword sequence, that is, the total number of codewords contained in the encrypted codeword sequence, may be determined in advance according to the construction mode corresponding to the number of error correction blocks before the encrypted codeword sequence is generated. For example, the length of the encrypted word sequence is controlled to be less than or equal to the number of supplementary bits that can be filled in the error correction block of the corresponding construction mode, so that the encrypted word sequence can be completely filled in the error correction block.

After the final information is constructed, the final information is arranged in a matrix to which a selected mask pattern is added, the mask number information in the format is supplemented according to the selected mask pattern, and finally, format and version information is added to generate a two-dimensional code (that is, a two-dimensional code symbol).

Figure 2:
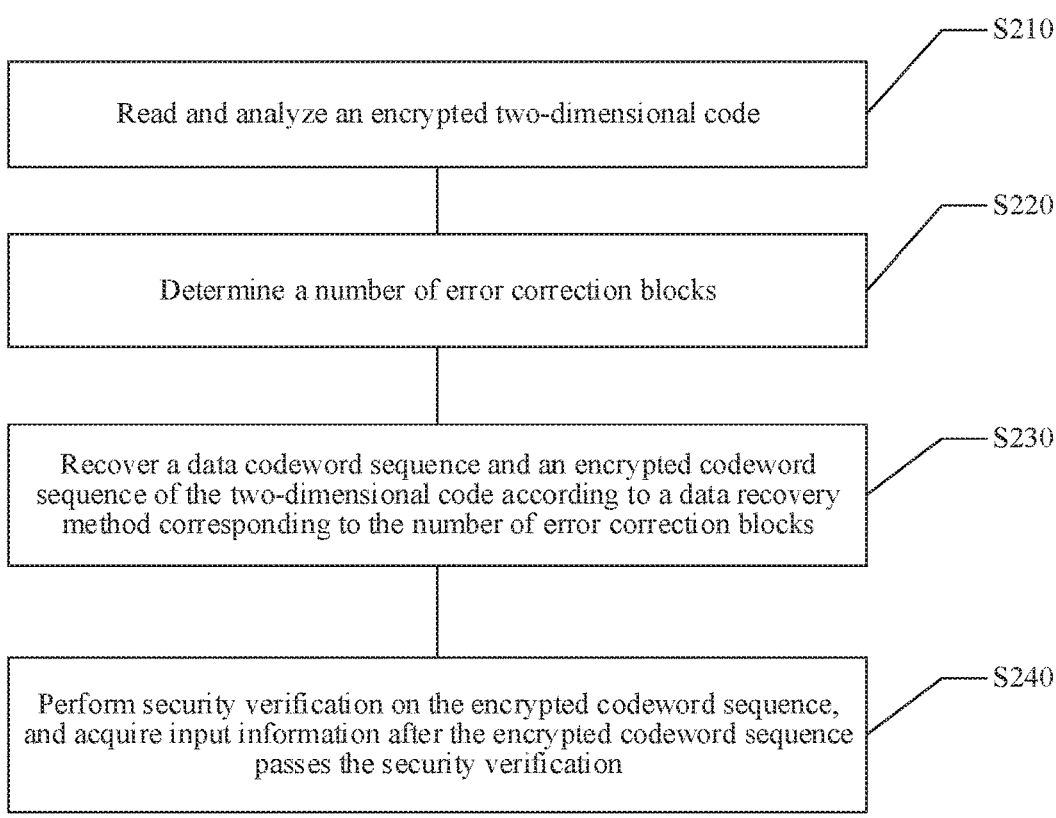
FIG. 2 is a flowchart of a two-dimensional code identification method according to an exemplary embodiment of the present disclosure.

Further, the exemplary embodiment further provides a two-dimensional code identification method, which may be applied to a terminal device. The terminal device may be, for example, a variety of electronic devices with a two-dimensional code scanning function, such as a mobile phone, a computer, a PDA, and the like. Referring to FIG. 2, the two-dimensional code identification method may include the following steps.

Step S210: Read and analyze an encrypted two-dimensional code.

In this step, the reading and analyzing an encrypted two-dimensional code includes: scanning and reading the encrypted two-dimensional code through the electronic device, analyzing a generating device in the two-dimensional code, decoding format information, acquiring a length of the data codeword sequence in the two-dimensional code, eliminating the added mask pattern to determine the version and format information, and then acquiring information such as an error correction level, a mask number, and an error correction code.

Step S220: Determine the number of error correction blocks.

For the method for determining the number of error correction blocks in this step, reference may be made to the method for determining the number of error correction blocks in step S130, and details are not described herein again.

Step S230: Recover a data codeword sequence and an encrypted codeword sequence of the two-dimensional code according to a data recovery method corresponding to the number of error correction blocks.

The recovering a data codeword sequence and an encrypted codeword sequence of the two-dimensional code according to a data recovery method corresponding to the number of error correction blocks includes: determining whether the number of error correction blocks is greater than a preset threshold, if yes, searching preset error correction characteristic table items for a corresponding error correction block that is specified to fill, and acquiring the encrypted codeword sequence in the error correction block through a decoding algorithm; or otherwise acquiring, through the decoding algorithm, the encrypted codeword sequence in a last data codeword block constituting the two-dimensional code.

The preset threshold value in this step may be the same as the preset threshold in the foregoing step S140. After the number of error correction blocks is determined, the data recovery method corresponding to the number of error correction blocks may include a block recovery data mode and a segmentation recovery data mode. When the number of error correction blocks is greater than the preset threshold, the block recovery data mode is adopted, and if the number of error correction blocks is not greater than (less than or equal to) the preset threshold, the segmentation recovery data mode is adopted.

For example, if the determined version is 3, the error correction level is Q, the data length is 70, and the number of corresponding error correction blocks found in the preset error correction characteristic table items (Table 1) is 2, since the number 2 of error correction blocks is greater than the preset threshold 1, the data codeword sequence and the encrypted codeword sequence may be recovered by using the block recovery data mode, that is, the error correction code of each block corresponding to the error correction level and the data length in Table 1 is searched, the error correction codes (35, 17, 9) of the corresponding error correction block is found therefrom, and an RS code encryption codeword sequence is sequentially acquired from the supplementary bits in the error correction blocks (35, 17, 9), thereby recovering an RS code data codeword sequence and the RS code encryption codeword sequence. However, if the determined number of error correction blocks is 1, since the number 1 of error correction blocks is equal to the preset threshold 1, the RS code encryption codeword sequence may be recovered by using the segmentation recovery data mode. That is, acquiring the filled RS code encryption codeword sequence from the supplementary bits of the last data codeword block constituting the two-dimensional code, thereby recovering the RS code data codeword sequence and the RS code encryption codeword sequence.

Step S240: Perform security verification on the encrypted codeword sequence, and acquire input information after the encrypted codeword sequence passes the security verification.

In this step, the performing security verification on the encrypted codeword sequence includes: after acquiring the RS code encryption codeword sequence, first performing finite field conversion on the RS code encryption codeword sequence through an RS code error correction decoding algorithm, and decrypting the encrypted codeword sequence after the finite field conversion according to a key management system, to obtain a corresponding key. Then, the key may be verified, and the method for verifying the key may vary depending on the key management system. For example, the acquired key may be matched with the acquired key in step S120, the acquired key may be matched with the RS code data codeword sequence, or the like. If it is determined that the two match, it is determined that the security verification succeeds, so that the original input information in the two-dimensional code symbol can be recovered. If it is determined that the two do not match, or the acquired key is 0, it indicates that the information may be tampered with, and it is determined that the security verification does not succeed, and the original input information in the two-dimensional code symbol cannot be recovered. It can be seen therefrom that, according to the present disclosure, it may further be checked whether the two-dimensional code information has been tampered with in time through the security verification of the two-dimensional code information, thereby ensuring the security of the two-dimensional code information in actual application scenarios.

It should be noted that although the various steps of the method in the present disclosure are described in a specific order in the accompanying drawings, this does not require or imply that the steps are bound to be performed in the specific order, or all the steps shown are bound to be performed to achieve the expected result. Additionally or alternatively, certain steps may be omitted, a plurality of steps may be combined into one step for execution, and/or one step may be decomposed into a plurality of steps for execution, and the like.

Figure 3:
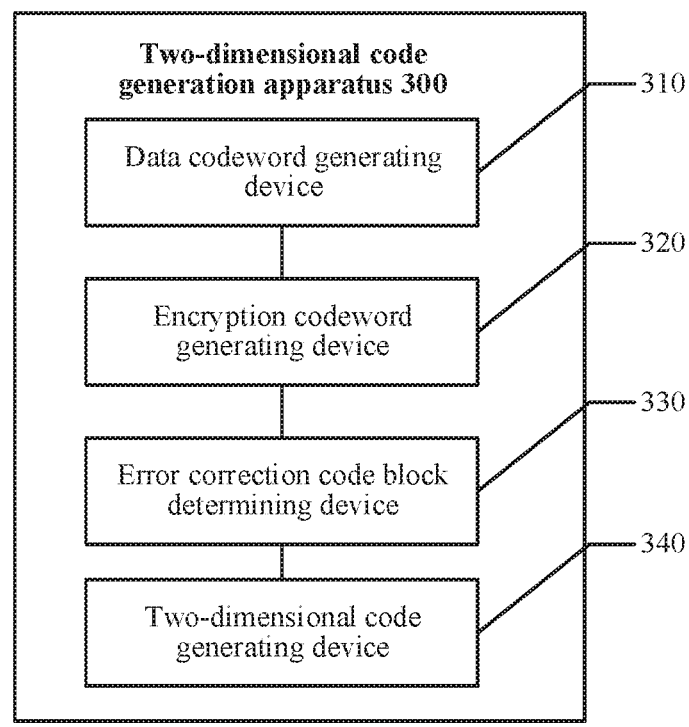
FIG. 3 is a schematic block diagram of a two-dimensional code generation apparatus according to an exemplary embodiment of the present disclosure.

In addition, in this example, a two-dimensional code generation apparatus is further provided. Referring to FIG. 3, a two-dimensional code generation apparatus 300 may include: a data codeword generating device 310, an encryption codeword generating device 320, an error correction code block determining device 330, and a two-dimensional code generating device 340.

The data codeword generating device 310 may be configured to generate a data codeword sequence according to input information.

The encryption codeword generating device 320 may be configured to encrypt the data codeword sequence to generate an encrypted codeword sequence.

The error correction code block determining device 330 may be configured to determine a number of error correction blocks.

The two-dimensional code generating device 340 may be configured to generate the two-dimensional code from the data codeword sequence and the encrypted codeword sequence according to a construction mode corresponding to the number of error correction blocks.

The specific details of each of the foregoing two-dimensional code generation apparatus devices have been described in detail in the corresponding two-dimensional code identification method, and therefore are not described herein again.

Figure 4:
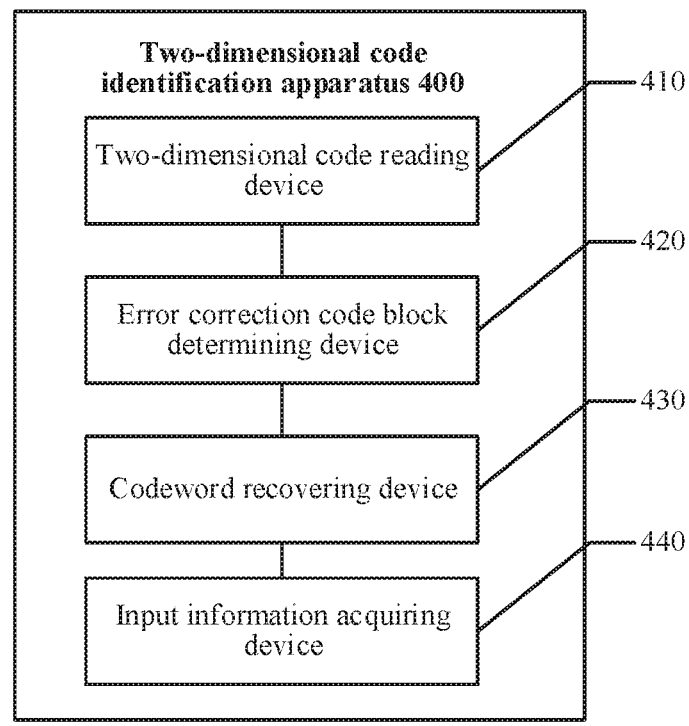
FIG. 4 is a schematic block diagram of a two-dimensional code identification apparatus according to an exemplary embodiment of the present disclosure.

In addition, in this exemplary embodiment, a two-dimensional code identification apparatus is further provided. Referring to FIG. 4, a two-dimensional code identification apparatus 400 may include: a two-dimensional code reading device 410, an error correction code block determining device 420, a codeword recovering device 430, and an input information acquiring device 440.

The two-dimensional code reading device 410 is configured to read and analyze an encrypted two-dimensional code.

The error correction code block determining device 420 is configured to determine a number of error correction blocks.

The codeword recovering device 430 is configured to recover a data codeword sequence and an encrypted codeword sequence of the two-dimensional code according to a data recovery method corresponding to the number of error correction blocks.

The input information acquiring device 440 is configured to perform security verification on the encrypted codeword sequence, and acquire input information after the encrypted codeword sequence passes the security verification.

The specific details of each of the foregoing two-dimensional code identification apparatus devices have been described in detail in the corresponding two-dimensional code identification method, and therefore are not described herein again.

It should be noted that although several devices of the two-dimensional code generation apparatus 300 are mentioned in the foregoing detailed description, such division is not mandatory. In fact, according to the embodiments of the present disclosure, the features and functions of the two or more device described above may be embodied in a device. On the contrary, the features and functions of one device described above may be further divided to be embodied by a plurality of devices.

In addition, in the exemplary embodiment of the present disclosure, an electronic device capable of implementing the foregoing method is further provided.

Those skilled in the art can understand that various aspects of the present disclosure may be implemented as a system, a method, or a program product. Therefore, various embodiments of the present disclosure may be specifically implemented in the following form: a hardware only embodiment, a software only embodiment (including firmware, microcode, and the like), or an embodiment of a combination of software and hardware, which may be collectively referred to as a "circuit", a "module", or a "system" herein.

An electronic device 500 according to an embodiment of the present disclosure is described below with reference to FIG. 5. The electronic device 500 shown in FIG. 5 is merely an example, and should not constitute any limitation on the functions and range of use of the embodiments of the present disclosure.

Figure 5:
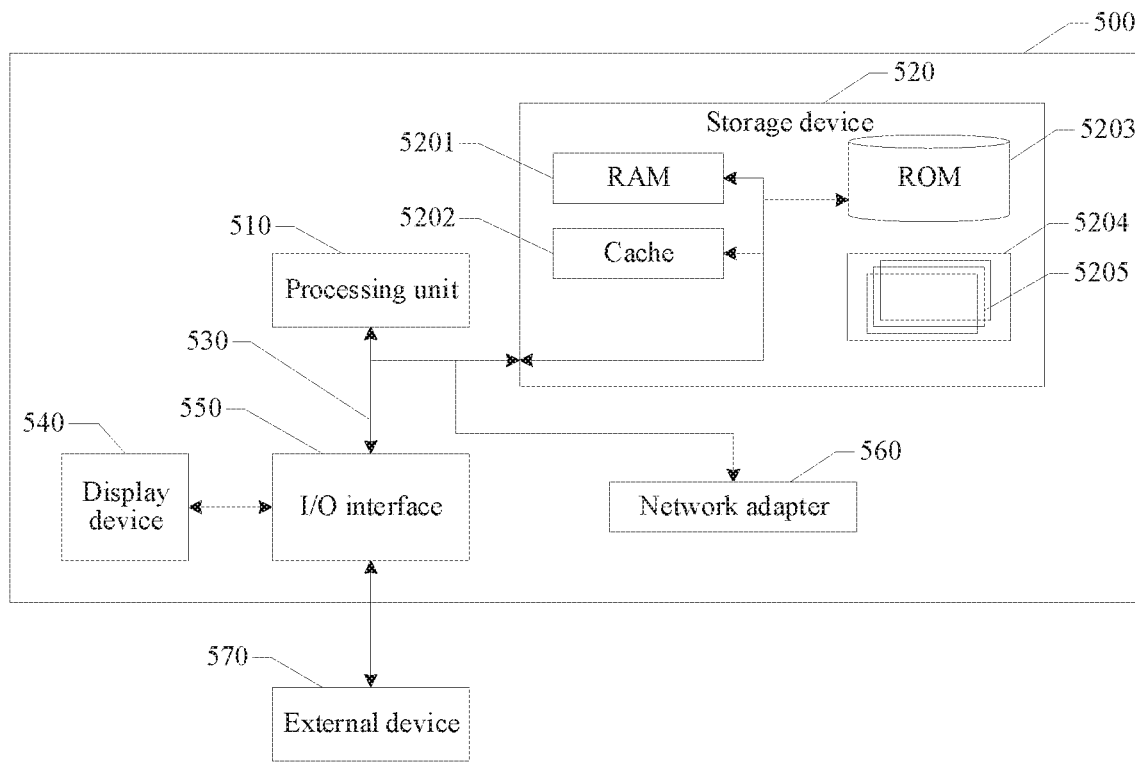
FIG. 5 is a schematic block diagram of an electronic device according to an exemplary embodiment of the present disclosure.

As shown in FIG. 5, the electronic device 500 is represented in a form of a general computing device. Components of the electronic device 500 may include, but are not limited to: the at least one processing unit 510, the at least one storage device 520, a bus 530 connecting different system components (including a storage device 520 and a processing unit 510), and a display device 540.

The storage device 520 stores a machine executable instruction, and the machine executable instruction may be executed by the processing unit 510, so that the processing unit 510 performs steps according to the various exemplary embodiments of the present disclosure described in the foregoing part of "the exemplary method" of the specification. For example, the processing unit 510 may perform steps S110-S140 as shown in FIG. 1 and steps S210-S240 as shown in FIG. 2.

The storage device 520 may include a readable medium in a form of a volatile storage device, such as a random access memory (RAM) 5201 and/or a cache storage device 5202, and may further include a read-only memory (ROM) 5203.

The storage device 520 may further include an instruction/utility tool 5204 having a set of (at least one) instruction modules 5205. Such an instruction device 5205 includes but is not limited to: an operating system, one or more application programs, other program modules, and program data, and each or a combination of these examples may include implementation of a network environment.

The bus 530 may be one or more of several types of bus structures, including a storage device bus or a storage device controller, a peripheral bus, a graphics acceleration port, a processing unit, or a local bus that uses any bus structure in a variety of bus structures.

The electronic device 500 may also communicate with one or more external devices 570 (such as a keyboard, a pointing device, a Bluetooth device, and the like), and may further communicate with one or more devices that enable a user to interact with the electronic device 500, and/or any device (such as a router, a modem, and the like) that enables the electronic device 500 to communicate with one or more other computing devices. Such communication may be performed using an input/output (I/O) interface 550. In addition, the electronic device 500 may further communicate with one or more networks (such as a local area network (LAN), a wide area network (WAN), and/or a public network, for example, the Internet) by using a network adapter 560. As shown in the figure, the network adapter 560 communicates with other devices of the electronic device 500 by using the bus 530. It should be understood that although not shown in the figure, other hardware and/or software modules may be used in combination with the electronic device 500, including but not limited to: microcode, a device driver, a redundant processing unit, an external disk drive array, a RAID system, a tape driver, a data backup storage system, and the like.

Through the description of the foregoing embodiments, those skilled in the art can easily understand that the exemplary embodiments described herein may be implemented through software, or may be implemented through software in combination with necessary hardware. Therefore, the technical solution according to the embodiments of the present disclosure may be embodied in the form of a software product. The software product may be stored in a non-volatile storage medium (which may be a CD-ROM, a U disk, a mobile hard disk, and the like) or on a network, including several instructions to enable a computing device (which may be a personal computer, a server, a terminal device, a network device, or the like) to perform the method according to the embodiment of the present disclosure.

In the exemplary embodiment of the present disclosure, a computer readable storage medium is further provided, a program product capable of implementing the foregoing method of this specification being stored thereon. In some possible embodiments, each aspect of the present disclosure may be further implemented in a form of a program product including a program code. When the program product is run on a terminal device, the program code is used to enable the terminal device to perform steps according to the various exemplary embodiments of the present disclosure described in the foregoing part of the exemplary method of the specification.

Figure 6:
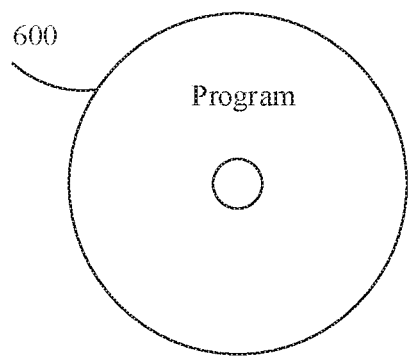
FIG. 6 is a schematic diagram of a computer readable storage medium according to an exemplary embodiment of the present disclosure.

Referring to FIG. 6, a program product 600 for implementing the foregoing method according to an embodiment of the present disclosure is described. The program product may use a portable compact disk read-only memory (CD-ROM), includes a program code, and may be run on a terminal device such as a personal computer. However, the program product of the present disclosure is not limited thereto. In this document, the readable storage medium may be any tangible medium including or storing a program, and the program may be used by or in combination with an instruction execution system, apparatus, or device.

The program product may use any combination of one or more readable media. The readable medium may be a readable signal medium or a readable storage medium. The readable storage media may be, for example but is not limited to, electrical, magnetic, optical, electromagnetic, infrared, or semiconductor systems, apparatuses or devices, or any combination thereof. More specific examples (a non-exhaustive list) of the readable storage medium include: an electrical connection with one or more wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical memory device, a magnetic storage device, or any appropriate combination thereof.

The computer readable storage medium may be a data signal included in a baseband or transmitted as a part of a carrier, which carries a readable program code. Such a transmitted data signal may have various forms, including but not limited to an electromagnetic signal, an optical signal, or any appropriate combination thereof. The readable storage medium may alternatively be any readable medium other than a readable storage medium, and the readable storage medium may be used to send, propagate, or transmit a program used by or in combination with an instruction execution system, apparatus, or device.

The program code included in the readable storage medium may be transmitted by using any suitable medium, including but not limited to a wireless medium, a wired medium, an optical cable, RF, or any appropriate combination thereof.

A program code for performing the operation of the present disclosure may be written by using any combination of one or more programming languages. The programming language includes an object-oriented programming language such as Java, C++, and a conventional procedural programming language such as a "C" Language or a similar programming language. The program code may be fully executed on a computing device of a user or partially executed on a user equipment, or may be executed as an independent software package, or may be partially executed on a computing device of a user and partially executed on a remote computing device, or may be fully executed on a remote computing device or a server. In case of the remote computing device, the remote computing device may be connected to the computing device of a user by using any network including a local area network (LAN) or a wide area network (WAN), or may be connected to an external computing device (for example, connected to the external computing device through the Internet by using an Internet service provider).

In addition, the foregoing accompanying drawings are only schematic illustrations of the processes included in the method according to exemplary embodiments of the present disclosure, and are not intended to be limiting. It is easily understood that the processes illustrated in the foregoing accompanying drawings do not indicate or define the chronological order of these processes. In addition, it is also easily understood that these processes may be performed, for example, synchronously or asynchronously in a plurality of modules.

After considering the specification and practicing the present disclosure, a person skilled in the art would easily conceive of other embodiments of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are merely for an illustration purpose, and the true scope and spirit of this disclosure are subject to the claims.

It should be understood that the present disclosure is not limited to the precise structures described above and shown in the accompanying drawings, and various modifications and changes can be made without departing from the scope of the present disclosure. The scope of the present disclosure is limited only by the appended claims.

The invention claimed is:

1. A two-dimensional code generation method, comprising:
   generating a data codeword sequence according to input information;
   encrypting the data codeword sequence to generate an encrypted codeword sequence;
   determining a number of error correction blocks; and
   generating a two-dimensional code from the data codeword sequence and the encrypted codeword sequence according to a construction mode corresponding to the number of error correction blocks, and, wherein the method further comprises:
   determining whether the number of error correction blocks is greater than a preset threshold;
   if yes, searching preset error correction characteristic table items for a corresponding error correction block, and filling the corresponding error correction block with the encrypted codeword sequence; or
   otherwise filling, with the encrypted codeword sequence, a last data codeword block constituting the two-dimensional code.

2. The method according to claim 1, wherein the encrypting the data codeword sequence to generate an encrypted codeword sequence comprises:
   generating a key corresponding to the data codeword sequence according to a key management system;
   encrypting the data codeword sequence according to an encryption algorithm by using the key; and
   converting the encrypted data codeword sequence into the encrypted codeword sequence according to a preset coding algorithm.

3. The method according to claim 1, wherein the determining a number of error correction blocks comprises:
   acquiring a length of the data codeword sequence and an error correction level; and
   searching preset error correction characteristic table items for a corresponding number of error correction blocks according to the length of the data codeword sequence and the error correction level.

4. A computer readable storage medium storing a computer program, the computer program, when executed by a processor, implementing the method according to claim 1.

5. A two-dimensional code identification method, comprising:
   reading and analyzing an encrypted two-dimensional code;
   acquiring a number of error correction blocks;
   recovering a data codeword sequence and an encrypted codeword sequence of the two-dimensional code according to a data recovery method corresponding to the number of error correction blocks; and
   performing security verification on the encrypted codeword sequence, and acquiring input information after the encrypted codeword sequence passes the security verification;
   wherein the recovering a data codeword sequence and an encrypted codeword sequence of the two-dimensional code according to a data recovery method corresponding to the number of error correction blocks comprises:
   determining whether the number of error correction blocks is greater than a preset threshold;
   if yes, searching preset error correction characteristic table items for a corresponding error correction block, and acquiring the encrypted codeword sequence in the corresponding error correction block through a decoding algorithm; or
   otherwise acquiring, through the decoding algorithm, the encrypted codeword sequence in a last data codeword block constituting the two-dimensional code.

6. An electronic device, comprising:
   a processor; and
   a storage medium storing machine-readable instructions, wherein, the machine-readable instructions, when executed by the processor, cause the processor to implement the method according to claim 5.

7. An electronic device, comprising:
a processor; and
a storage medium storing machine-readable instructions, wherein, the machine-readable instructions, when executed by the processor, cause the processor to:
generate a data codeword sequence according to input information;
encrypt the data codeword sequence to generate an encrypted codeword sequence;
determine a number of error correction blocks; and
generate a two-dimensional code from the data codeword sequence and the encrypted codeword sequence according to a construction mode corresponding to the number of error correction blocks;
wherein when generating the two-dimensional code from the data codeword sequence and the encrypted codeword sequence, the processor is further caused to:
determine whether the number of error correction blocks is greater than a preset threshold;
if yes, search preset error correction characteristic table items for a corresponding error correction block, and fill the corresponding error correction block with the encrypted codeword sequence; or
otherwise fill, with the encrypted codeword sequence, a last data codeword block constituting the two-dimensional code.

8. The device according to claim 7, wherein when encrypting the data codeword sequence to generate the encrypted codeword sequence, the processor is further caused to:
generate a key corresponding to the data codeword sequence according to a key management system;
encrypt the data codeword sequence according to an encryption algorithm by using the key; and
convert the encrypted data codeword sequence into the encrypted codeword sequence according to a preset coding algorithm.

9. The device according to claim 7, wherein when determining the number of error correction blocks, the processor is further caused to:
acquire a length of the data codeword sequence and an error correction level; and
search preset error correction characteristic table items for a corresponding number of error correction blocks according to the length of the data codeword sequence and the error correction level.

* * * * *